United States Patent

Fujimoto

(10) Patent No.: US 10,600,172 B2
(45) Date of Patent: Mar. 24, 2020

(54) IMAGE PROCESSING APPARATUS AND IMAGE PROCESSING METHOD

(71) Applicant: SONY CORPORATION, Tokyo (JP)

(72) Inventor: Masakatsu Fujimoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/070,394

(22) PCT Filed: Dec. 20, 2016

(86) PCT No.: PCT/JP2016/087903
§ 371 (c)(1),
(2) Date: Jul. 16, 2018

(87) PCT Pub. No.: WO2017/134952
PCT Pub. Date: Aug. 10, 2017

(65) Prior Publication Data
US 2019/0213722 A1     Jul. 11, 2019

(30) Foreign Application Priority Data

Feb. 5, 2016    (JP) ................................ 2016-020692

(51) Int. Cl.
*G06T 5/50*     (2006.01)
*H04N 5/232*    (2006.01)
(Continued)

(52) U.S. Cl.
CPC ................. *G06T 5/50* (2013.01); *G06T 5/00* (2013.01); *G06T 5/002* (2013.01); *H04N 1/409* (2013.01);
(Continued)

(58) Field of Classification Search
CPC .. G06T 5/50; G06T 5/00; G06T 5/002; H04N 1/409; H04N 5/21; H04N 5/232; H04N 5/235; H04N 5/2355
(Continued)

(56) References Cited

U.S. PATENT DOCUMENTS

2010/0322509 A1* 12/2010 Shimizu ................. G06T 5/002
382/162
2011/0268368 A1* 11/2011 Toyoda ................... G06T 5/002
382/264

(Continued)

FOREIGN PATENT DOCUMENTS

CN        102970488 A     3/2013
CN        104349018 A     2/2015
(Continued)

OTHER PUBLICATIONS

International Search Report and Written Opinion of PCT Application No. PCT/JP2016/087903, dated Mar. 21, 2017, 09 pages of ISRWO.

*Primary Examiner* — Sinh Tran
*Assistant Examiner* — Zhenzhen Wu
(74) *Attorney, Agent, or Firm* — Chip Law Group

(57) ABSTRACT

A noise of an image signal generated by mixing a plurality of image signals is accurately estimated. In an image processing apparatus including an input unit and an estimation unit, a mixed image signal is input to the input unit, the mixed image signal being obtained by mixing a plurality of image signals with different exposure times that have been generated by an image sensor, on a basis of a predetermined mix ratio. The estimation unit is configured to estimate a mixed image signal noise being a noise of the mixed image signal, on a basis of the mix ratio, a noise characteristic coefficient indicating a noise characteristic of the image (Continued)

sensor, and a ratio between the exposure times in the plurality of image signals.

5 Claims, 14 Drawing Sheets

(51) Int. Cl.
  *H04N 1/409* (2006.01)
  *H04N 5/235* (2006.01)
  *H04N 5/217* (2011.01)
  *G06T 5/00* (2006.01)

(52) U.S. Cl.
  CPC ............ *H04N 5/217* (2013.01); *H04N 5/232* (2013.01); *H04N 5/235* (2013.01); *H04N 5/2355* (2013.01); *G06T 2207/20208* (2013.01)

(58) Field of Classification Search
  USPC ......................................................... 348/241
  See application file for complete search history.

(56) References Cited

U.S. PATENT DOCUMENTS

| | | | | |
|---|---|---|---|---|
| 2012/0038797 | A1* | 2/2012 | Jang ..................... | H04N 5/2355 348/241 |
| 2012/0281111 | A1* | 11/2012 | Jo ......................... | H04N 5/217 348/229.1 |
| 2013/0051700 | A1 | 2/2013 | Jo | |
| 2014/0044366 | A1* | 2/2014 | Yamaguchi ............ | G06T 11/60 382/232 |
| 2014/0247985 | A1* | 9/2014 | Park ........................ | G06T 5/40 382/170 |
| 2015/0042848 | A1 | 2/2015 | Furukawa et al. | |

FOREIGN PATENT DOCUMENTS

| | | |
|---|---|---|
| EP | 2565843 A2 | 3/2013 |
| JP | 2010-124412 A | 6/2010 |
| JP | 2013-066142 A | 4/2013 |
| JP | 2015-033107 A | 2/2015 |

\* cited by examiner

| VARIABLE IN FORMULA 7 | VARIABLE AFTER SWITCHING | | |
|---|---|---|---|
| | PROCESSING REGION 1 | PROCESSING REGION 2 | PROCESSING REGION 3 |
| $\alpha$ | 1 | $1-\beta$ | $1-\beta$ |
| $\beta$ | 0 | $\beta_1$ | $\beta_2$ |
| $S_1$ | 1 | 1 | $S_1$ |
| $S_2$ | — | $S_1$ | $S_2$ |

FIG. 7A

| VARIABLE | CONDITION | VALUE OF VARIABLE WHEN CONDITION IS SATISFIED | VALUE OF VARIABLE WHEN CONDITION IS UNSATISFIED |
|---|---|---|---|
| $\beta_1$ | $(X-TH1) \times SLOPE\_L < LIMIT\_L$ | $(X-TH1) \times SLOPE\_L$ | $LIMIT\_L$ |
| $\beta_2$ | $(X-TH3) \times SLOPE\_S < LIMIT\_S$ | $(X-TH3) \times SLOPE\_S$ | $LIMIT\_S$ |

FIG. 7B

IMAGE PROCESSING APPARATUS AND IMAGE PROCESSING METHOD

CROSS REFERENCE TO RELATED APPLICATIONS

This application is a U.S. National Phase of International Patent Application No. PCT/JP2016/087903 filed on Dec. 20, 2016, which claims priority benefit of Japanese Patent Application No. JP 2016-020692 filed in the Japan Patent Office on Feb. 5, 2016. Each of the above-referenced applications is hereby incorporated herein by reference in its entirety.

TECHNICAL FIELD

The present technology relates to an image processing apparatus and an image processing method. More particularly, the present technology relates to an image processing apparatus and an image processing method that process an image signal obtained by mixing a plurality of image signals with different exposure times.

BACKGROUND ART

There has been conventionally used an imaging apparatus that generates images of the same subject that have different exposure times, and synthesizes these images into one image. The image synthesized in this manner is referred to as a high dynamic range (HDR) image. By the imaging apparatus that generates this HDR image, the generation of an image without defects such as so-called blown out highlights and blocked up shadows can be performed in image capturing of a subject having a wide dynamic range, as in the case of performing shooting of a person in a backlight state. In such an imaging apparatus, an HDR image is generated by the synthesis of an image signal with a long exposure time and an image signal with a short exposure time, and a noise of this HDR image is estimated. Then, processing for achieving improvement in image quality of the HDR image is performed on the basis of the estimated noise. For example, values obtained by multiplying square roots of the image signals obtained before synthesis, by a predetermined constant are estimated as noises of these image signals. Then, there is proposed a system that estimates, as a noise of an HDR image, a value obtained by synthesizing a plurality of noise estimate values that have been estimated in the above-described manner, on the basis of a synthesis ratio in HDR synthesis (e.g., refer to Patent Literature 1.).

CITATION LIST

Patent Literature

Patent Literature 1: JP 2015-033107A

DISCLOSURE OF INVENTION

Technical Problem

In the aforementioned conventional technology, a noise of an HDR image obtained by synthesizing a plurality of image signals with different exposure times is estimated, and is used for processing of image quality improvement of the HDR image. Nevertheless, there is such a problem that the noise of the HDR image cannot be accurately estimated because the characteristic of the noise varies depending on the length of an exposure time, and sufficient improvement in image quality cannot be performed.

The present technology has been produced in view of such a situation, and the object of the present technology is to accurately estimate a noise of an image signal generated by mixing a plurality of image signals.

Solution to Problem

The present technology has been made in order to solve the above problems. A first aspect of the present technology is an image processing apparatus and an image processing method, the image processing apparatus including: an input unit to which a mixed image signal is input, the mixed image signal being obtained by mixing a plurality of image signals with different exposure times that have been generated by an image sensor, on a basis of a predetermined mix ratio; and an estimation unit configured to estimate a mixed image signal noise being a noise of the mixed image signal, on a basis of the mix ratio, a noise characteristic coefficient indicating a noise characteristic of the image sensor, and a ratio between the exposure times in the plurality of image signals. This brings about a function of estimating the mixed image signal noise on the basis of the mix ratio, the noise characteristic coefficient, and the ratio between the exposure times.

In addition, in the first aspect, the estimation unit may estimate the mixed image signal noise on a basis of a plurality of noise characteristics with levels adjusted by multiplying respective noise characteristics in the plurality of image signals that are indicated by the noise characteristic coefficient, by a ratio between the exposure times, and the mix ratio. This brings about a function of causing the mixed image signal noise to be estimated on the basis of the noise characteristics of the plurality of image signals that have levels adjusted by the ratio between the exposure times, and the mix ratio.

In addition, in the first aspect, a selection unit configured to select, among a plurality of mixed image signals included in a same frame as a target image signal being the mixed image signal for which the mixed image signal noise has been estimated, a mixed image signal having a difference from the target image signal that is smaller than the estimated mixed image signal noise; and a noise removal unit configured to remove a noise of the target image signal by generating an average of the target image signal and the selected mixed image signal may be further included. This brings about a function of causing noise removal processing of the mixed image signal to be performed on the basis of the estimated mixed image signal noise.

In addition, in the first aspect, a difference generation unit configured to generate a difference from a second target image signal being a mixed image signal arranged, in a frame different from a target image signal being the mixed image signal for which the mixed image signal noise has been estimated, at a same position as the target image signal; and a second noise removal unit configured to remove a noise of the target image signal by performing mixing of the target image signal and the second target image signal on a basis of the generated mixed image signal noise and the generated difference may be further included. This brings about a function of causing noise removal processing of the mixed image signal to be performed on the basis of the estimated mixed image signal noise.

In addition, in the first aspect, the second noise removal unit may perform the mixing in a case where the generated difference is smaller than the generated mixed image signal noise. This brings about a function of causing mixing to be performed in a case where the difference between the target image signal and the second target image signal is smaller than the mixed image signal noise.

Advantageous Effects of Invention

According to the present technology, an excellent effect of accurately estimating a noise of an image signal generated by mixing a plurality of image signals can be caused. Note that effects described herein are not necessarily limitative, and any effect that is desired to be described in the present disclosure may be admitted.

BRIEF DESCRIPTION OF DRAWINGS

FIGS. 7A and 7B are diagrams illustrating an example of switching of variables in the estimation of a mixed image signal noise in the first embodiment of the present technology.

MODE(S) FOR CARRYING OUT THE INVENTION

A mode for carrying out the present technology (hereinafter, referred to as an embodiment) will be described below. The description will be given in the following order.

1. First Embodiment (Example of Case of Using Estimated Noise for Two-Dimensional Noise Reduction Processing)
2. Second Embodiment (Example of Case of Using Estimated Noise for Three-Dimensional Noise Reduction Processing)
3. Modified Example <1. First Embodiment>

[Configuration of Imaging Apparatus]

Figure 1:
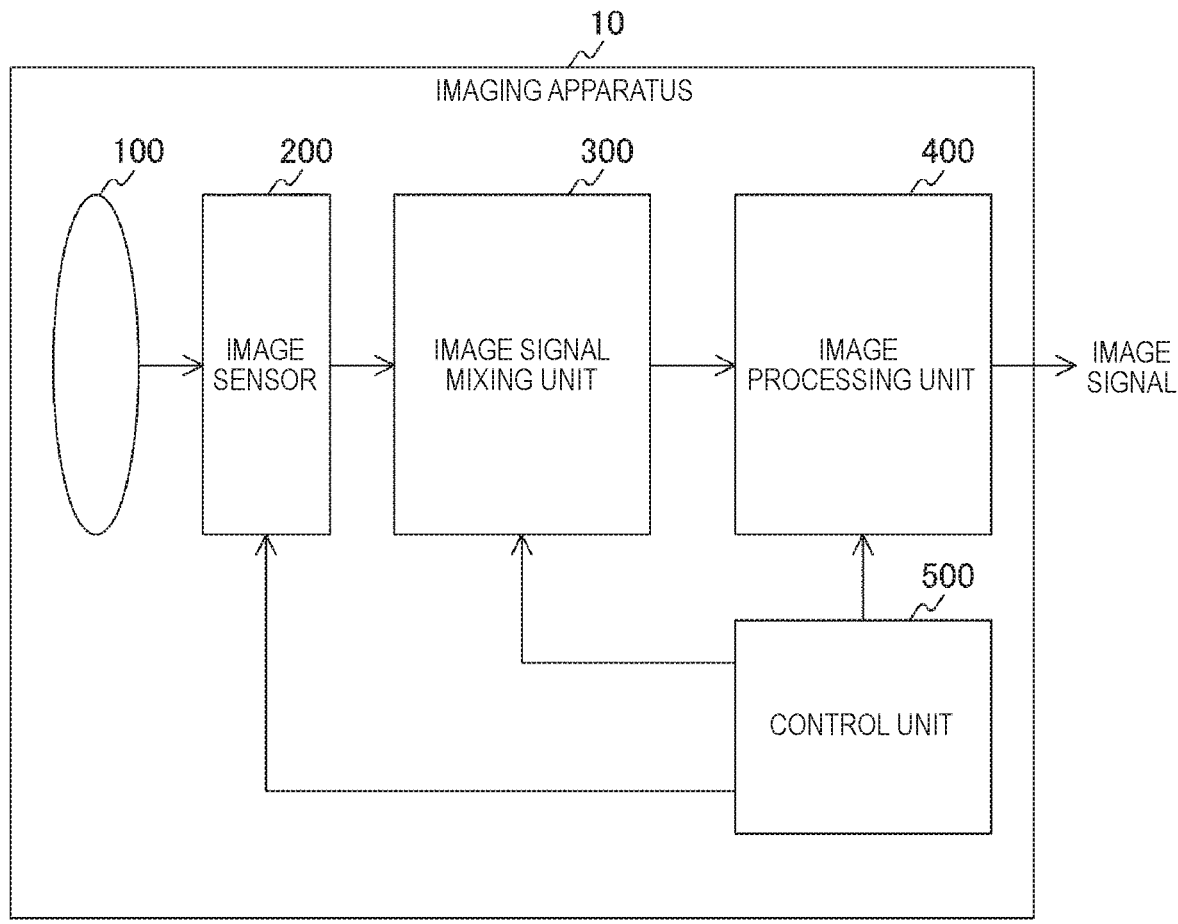
FIG. 1 is a diagram illustrating a configuration example of an imaging apparatus 10 in an embodiment of the present technology.

FIG. 1 is a diagram illustrating a configuration example of an imaging apparatus 10 in the embodiment of the present technology. The imaging apparatus 10 in this figure includes a lens 100, an image sensor 200, an image signal mixing unit 300, an image processing unit 400, and a control unit 500.

The lens 100 optically forms an image of a subject on the image sensor 200.

The image sensor 200 converts an optical image formed by the lens 100, into an image signal, and outputs the image signal. The image sensor 200 includes pixels that generate image signals and are two-dimensionally arranged on a light receiving surface being a surface on which the optical image is formed. The pixels include pixels (R pixels) that output image signals corresponding to red light, pixels (G pixels) that output image signals corresponding to green light, and pixels (B pixels) that output image signals corresponding to blue light. By these pixels, image signals corresponding to one screen are generated, and output from the image sensor 200. Here, the image signals corresponding to one screen are referred to as a frame. In addition, the image sensor 200 can generate a plurality of image signals with different exposure times, and output the image signals to the image signal mixing unit 300. Here, the image sensor 200 is assumed to generate three image signals with different exposure times. The details of the generation of image signals in the image sensor 200 will be mentioned later.

The image signal mixing unit 300 generates a mixed image signal that is obtained by mixing the plurality of image signals with different exposure times that have been generated by the image sensor 200. An HDR image can be generated by this mixed image signal. The details of the generation of the mixed image signal in the image signal mixing unit 300 will be mentioned later.

The image processing unit 400 performs processing on the mixed image signal generated by the image signal mixing unit 300. As the processing, the image processing unit 400 performs noise removal processing of the mixed image signal, which will be mentioned later. The image signal processed by the image processing unit 400 is output to the outside of the imaging apparatus 10. The details of the configuration of the image processing unit 400 will be mentioned later.

The control unit 500 controls the entire imaging apparatus 10.

[Generation of Image Signal]

Figure 2:
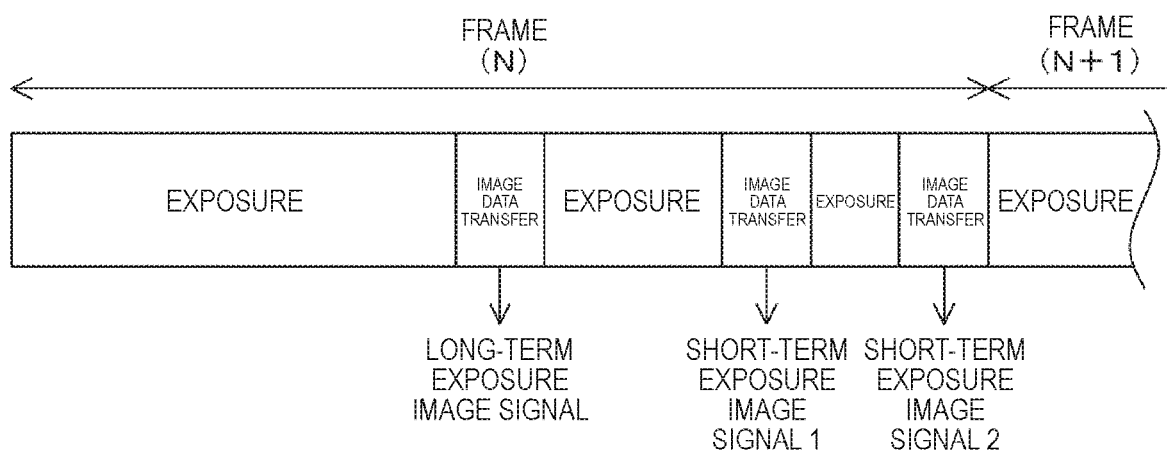
FIG. 2 is a diagram illustrating an example of generation of an image signal in a first embodiment of the present technology.

FIG. 2 is a diagram illustrating an example of generation of an image signal in the first embodiment of the present technology. In the embodiment of the present technology, in the generation of image signal of one frame, exposure and image data transfer following the exposure are performed three times, and image signals corresponding to three screens are generated. In addition, as obviously seen from this figure, exposure times are changed in the generation of these three image signals. These are controlled by the control unit 500. An image signal generated in the longest exposure time will be referred to as a long-term exposure image signal. An image signal generated in the second longest exposure time after this long-term exposure image signal will be referred to as a short-term exposure image signal 1. An image signal generated in the shortest exposure time will be referred to as a short-term exposure image signal 2. These image signals are mixed by the image signal mixing unit 300, and an image signal corresponding to one screen, that is to say, a frame is generated.

[Mixing of Image Signals]

Figure 3:
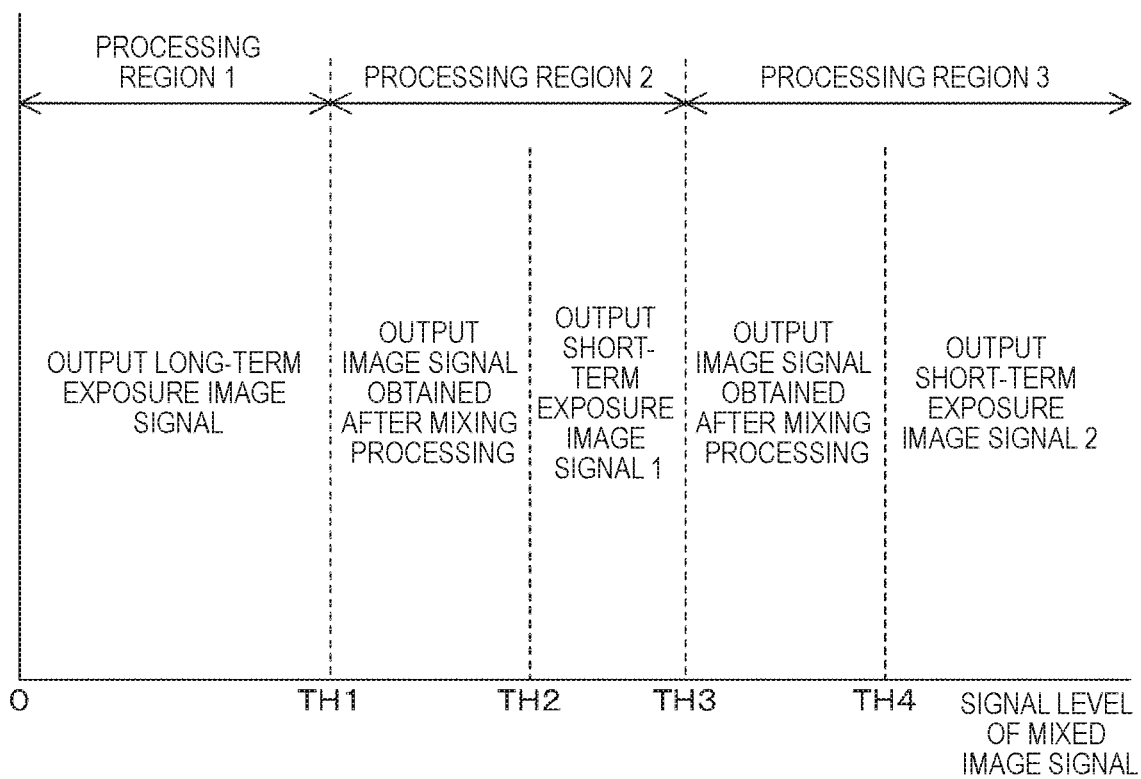
FIG. 3 is a diagram illustrating an example of mixing processing of image signals in the embodiment of the present technology.

FIG. 3 is a diagram illustrating an example of mixing processing of image signals in the embodiment of the present technology. This figure represents mixing processing in the image signal mixing unit 300, and represents a relationship between mixing processing performed on the long-term exposure image signal, the short-term exposure image signal 1, and the short-term exposure image signal 2, and a signal level of a mixed image signal. In a region in which a signal level of a mixed image signal is low, the mixing of image signals is not performed, and only the long-term exposure image signal is output. The region will be referred to as a processing region 1.

When the signal level of the mixed image signal exceeds a threshold value (TH1), the mixing of the long-term exposure image signal and the short-term exposure image signal 1 is started. In the mixing, the adjustment of a signal level of the short-term exposure image signal 1 is performed on the basis of an exposure ratio $S_1$, which is a ratio between the exposure times of the long-term exposure image signal and the short-term exposure image signal 1. The mixing can be performed on the basis of the following formula.

$$x=(1-\alpha) \times P\_long + \alpha \times S_1 \times P\_short1$$

Here, x denotes a mixed image signal. In addition, P_long denotes the long-term exposure image signal. In addition, P_short1 denotes the short-term exposure image signal 1. In addition, α denotes a mix ratio. In addition, the exposure ratio $S_1$ can be generated on the basis of the following formula.

$S_1$=exposure time of long-term exposure image signal/ exposure time of short-term exposure image signal 1

When the signal level of the mixed image signal exceeds a threshold value (TH2), the mixing processing of the image signals ends, and only the short-term exposure image signal 1 is output. The region will be referred to as a processing region 2.

When the signal level of the mixed image signal exceeds a threshold value (TH3), the mixing of the short-term exposure image signal 1 and the short-term exposure image signal 2 is started. In the mixing, the adjustment of a signal level of the short-term exposure image signal 2 is performed on the basis of an exposure ratio $S_2$, which is a ratio between the exposure times of the long-term exposure image signal and the short-term exposure image signal 2. The mixing can be performed on the basis of the following formula.

$$x=(1-\beta) \times S_1 \times P\_short1 + \beta \times S_2 \times P\_short2$$

Here, P_short2 denotes the short-term exposure image signal 2. In addition, β denotes a mix ratio. In addition, the exposure ratio $S_2$ can be generated on the basis of the following formula.

$S_2$=exposure time of long-term exposure image signal/ exposure time of short-term exposure image signal 2

When the signal level of the mixed image signal exceeds a threshold value (TH4), the mixing processing of the image signals ends, and only the short-term exposure image signal 2 is output. The region will be referred to as a processing region 3. In this manner, the mixing of the long-term exposure image signal, the short-term exposure image signal 1, and the short-term exposure image signal 2 is performed.

[Relationship between Image Signal and Mix Ratio]

Figure 4A:
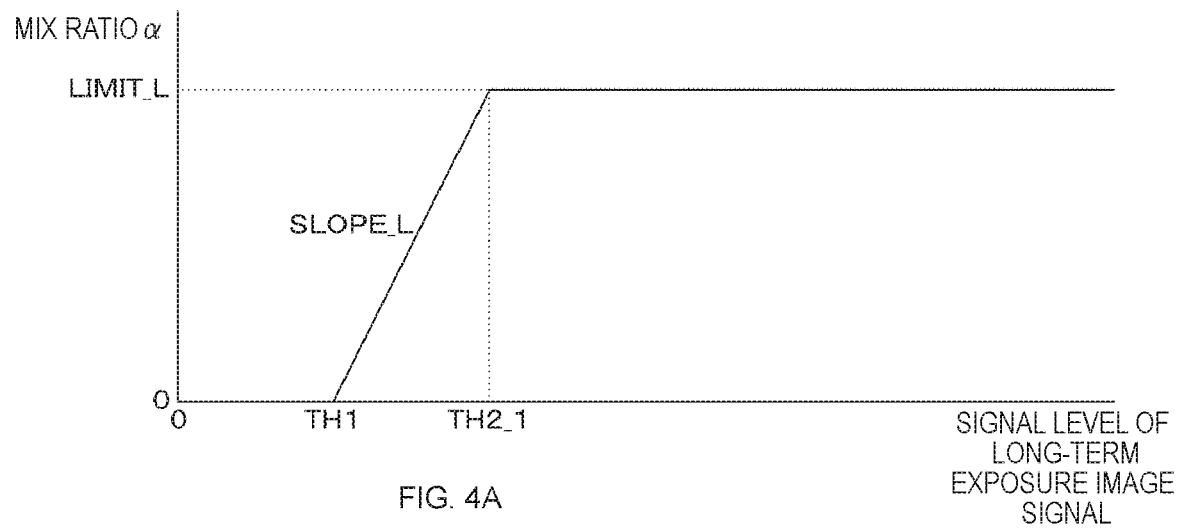
FIGS. 4A and 4B are diagrams illustrating an example of a relationship between an image signal and a mix ratio in the embodiment of the present technology.
Figure 4B:
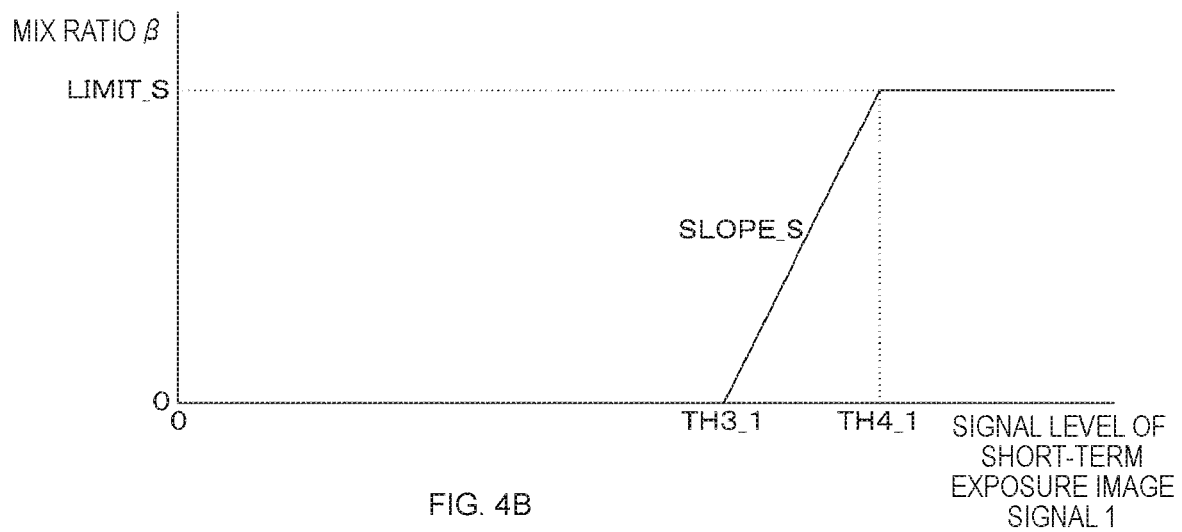

FIGS. 4A and 4B are diagrams illustrating an example of a relationship between an image signal and a mix ratio in the embodiment of the present technology. In this figure, "a" represents a relationship between the long-term exposure image signal and a mix ratio α. When the signal level of the long-term exposure image signal is 0 to TH1, the mix ratio α is 0. When the signal level of the long-term exposure image signal exceeds TH1, the mix ratio α linearly increases up to LIMIT_L, which is a limit value. As the limit value LIMIT_L, a value "1" can be applied. In addition, SLOPE_L in "a" in this figure represents an inclination of a graph at the time. The signal level of the long-term exposure image signal that is obtained when the mix ratio α reaches the limit value LIMIT_L is represented by TH2_1. This TH2_1 is a value corresponding to TH2 described in FIG. 3.

In this figure, "b" represents a relationship between the short-term exposure image signal 1 and a mix ratio β. When the signal level of the short-term exposure image signal 1 is 0 to TH3_1, the mix ratio β is 0. When the signal level of the short-term exposure image signal 1 exceeds TH3_1, the mix ratio β linearly increases up to LIMIT_S, which is a limit value. SLOPE_S in "b" in this figure represents an inclination of a graph at the time. Here, TH3_1 corresponds to a value obtained by dividing TH3 described in FIG. 3, by the exposure ratio S1. The signal level of the short-term exposure image signal 1 that is obtained when the mix ratio β reaches the limit value LIMIT_S is represented by TH4_1. This TH4_1 is a value corresponding to TH4 described in FIG. 3.

[Relationship Between Mixed Image Signal and Noise]

Figure 5:
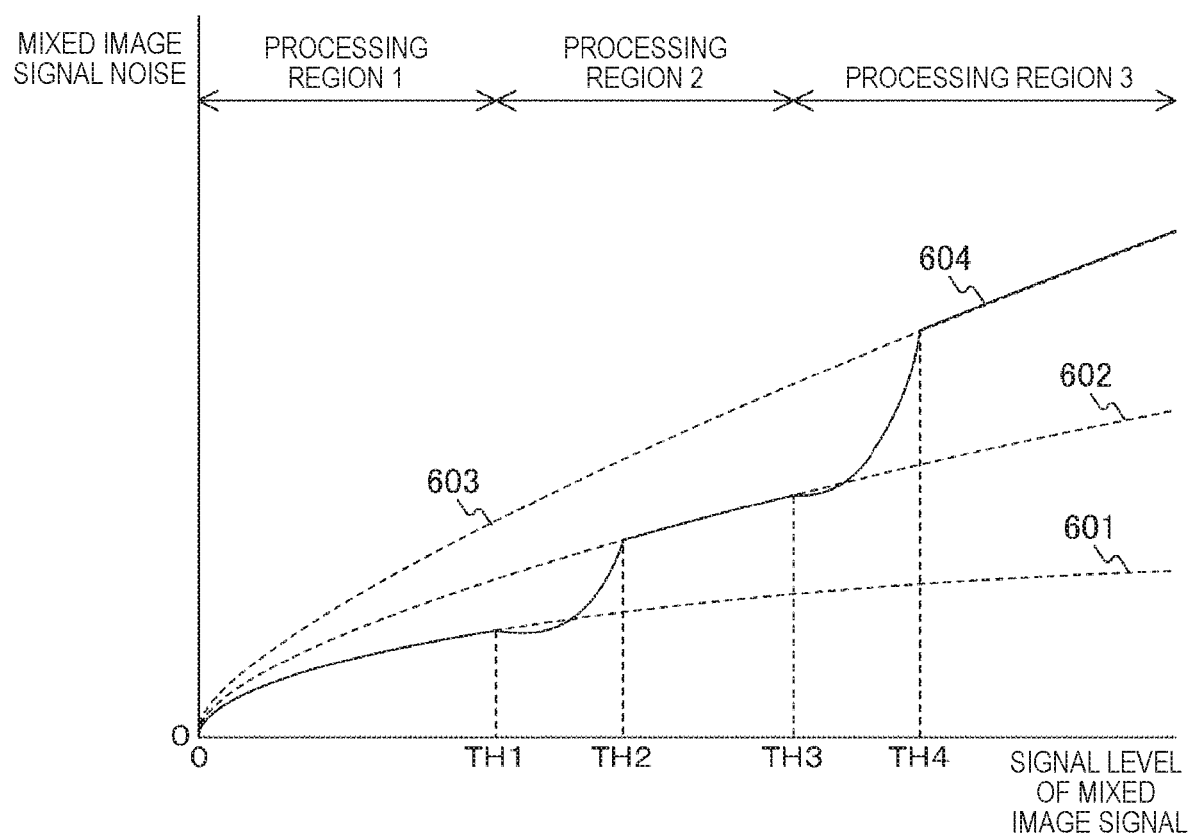
FIG. 5 is a diagram illustrating a noise characteristic of a mixed image signal in the embodiment of the present technology.

FIG. 5 is a diagram illustrating a noise characteristic of a mixed image signal in the embodiment of the present technology. This figure represents a relationship between a mixed image signal and a mixed image signal noise being a noise of the mixed image signal. In other words, a noise characteristic of the mixed image signal indicates a relationship between the mixed image signal and the mixed image signal noise. In this figure, graphs indicated by broken lines represent noise characteristics of the long-term exposure image signal, the short-term exposure image signal 1, and the short-term exposure image signal 2. Graphs 601 to 603 respectively correspond to the noise characteristics of the long-term exposure image signal, the short-term exposure image signal 1, and the short-term exposure image signal 2. In addition, a graph 604 indicated by a solid line in this figure represents the noise characteristic of the mixed image signal.

The noise characteristic of the mixed image signal in regions in which mixing processing of image signals is performed, in the processing region 2 and the processing region 3 described in FIG. 3, can be estimated on the basis of two noise characteristics to be mixed. In other words, in a region in which the signal level of the mixed image signal is TH1 to TH2, the noise of the mixed image signal can be estimated on the basis of the long-term exposure image signal and the short-term exposure image signal 1. In addition, in a region in which the signal level of the mixed image signal is TH3 to TH4, the noise of the mixed image signal can be estimated on the basis of the short-term exposure image signal 1 and the short-term exposure image signal 2. The details of the estimation of these mixed image signals will be mentioned later.

[Configuration of Image Processing Unit]

Figure 6:
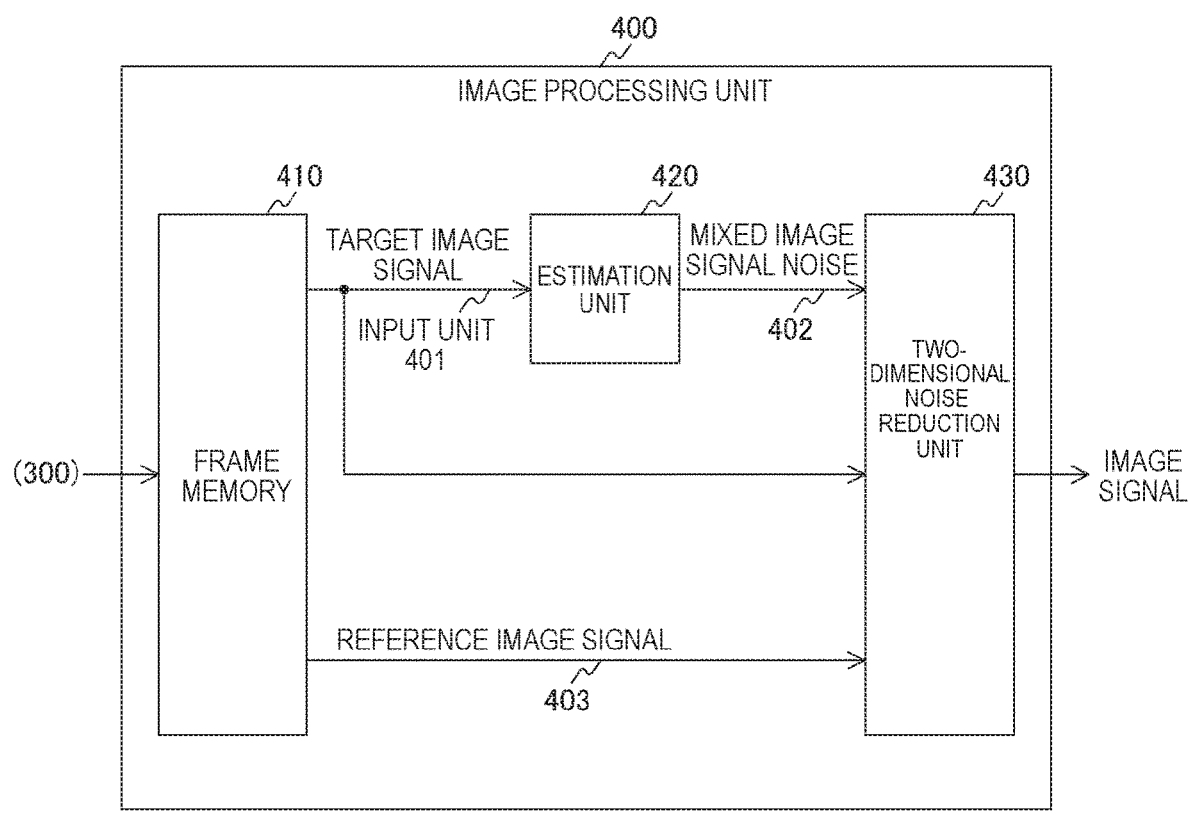
FIG. 6 is a diagram illustrating a configuration example of an image processing unit 400 in the first embodiment of the present technology.

FIG. 6 is a diagram illustrating a configuration example of the image processing unit 400 in the first embodiment of the present technology. The image processing unit 400 includes a frame memory 410, an input unit 401, an estimation unit 420, and a two-dimensional noise reduction unit 430. Note that the image processing unit 400 is an example of an image processing apparatus described in the claims.

The frame memory 410 is a memory that stores mixed image signals corresponding to one screen, that is to say, a frame. The frame memory 410 outputs a target image signal and reference image signals. Here, the target image signal is a mixed image signal serving as a target of the noise removal processing, which will be mentioned later. In addition, the reference image signals are mixed image signals arranged around the target image signal in the frame. The details of the target image signal and the reference image signals will be mentioned later.

The target image signal being a mixed image signal that has been output from the frame memory 410 is input to the input unit 401. The input unit 401 can be formed by a signal line.

The estimation unit 420 estimates a mixed image signal noise being a noise of the mixed image signal. The estimation unit 420 performs the estimation of a mixed image signal noise of the target image signal input to the input unit 401, and outputs the estimated mixed image signal noise. The estimation is performed on the basis of a mix ratio of the mixed image signal, a noise characteristic coefficient indicating a noise characteristic of the image sensor 200, and an exposure ratio. The estimated mixed image signal noise is output to the two-dimensional noise reduction unit 430 via a signal line 402. The details of the estimation of the mixed image signal noise will be mentioned later.

The two-dimensional noise reduction unit 430 removes the noise of the mixed image signal. The two-dimensional noise reduction unit 430 performs removal of the noise by attenuating high-frequency components in mixed image signals belonging to the same frame. The details of the configuration of the two-dimensional noise reduction unit 430 will be mentioned later.

[Estimation of Mixed Image Signal Noise]

The noise characteristic of the image sensor 200 can be represented by the following formula, for example.

[Math. 1]

$$\sigma(x)=\sqrt{a \times x+b} \qquad \text{Formula 1}$$

Here, $\sigma(x)$ denotes a noise characteristic of the image sensor 200. In addition, x denotes an image signal output from the image sensor 200. In addition, a and b denote noise characteristic coefficients. The first term in a square root sign in Formula 1 represents a noise component that is proportional to the image signal x. For example, a shot noise corresponds to this. In addition, the second term represents a noise component that is unaffected by the level of the image signal x. For example, a noise caused by dark current of pixels corresponds to this. The noise characteristic in Formula 1 mentioned above corresponds to the noise characteristic of the long-term exposure image signal.

On the other hand, the noise characteristic of the short-term exposure image signal 1 can be represented by the following formula using the exposure ratio $S_1$ described in FIG. 3.

[Math. 2]

$$\sigma(x)=S_1 \times \sqrt{a \times x+b} \qquad \text{Formula 2}$$

In this manner, the adjustment of the level can be performed by multiplying the noise characteristic of the long-term exposure image signal by the exposure ratio. The noise characteristic of the short-term exposure image signal 1 can be thereby obtained accurately. In addition, the noise characteristic of the short-term exposure image signal 2 can be represented by the following formula using the exposure ratio $S_2$.

[Math. 3]

$$\sigma(x)=S_1=\sqrt{a \times x+b} \qquad \text{Formula 3}$$

For estimating the mixed image signal noise, when the image signal x in Formulae 1 to 3 is changed to a mixed image signal X, and both members are squared, the noise characteristic of the long-term exposure image signal can be represented by the following formula.

$$\sigma^2(X)=a \times X+b$$

In the short-term exposure image signal 1, a relationship of $X=S_1 \times x$ is satisfied. Thus, the noise characteristic of the short-term exposure image signal 1 can be represented by the following formula.

$$\sigma^2(X)=S_1 \times a \times X + S_1^2 \times b \qquad \text{Formula 4}$$

In a similar manner, the noise characteristic of the short-term exposure image signal 2 can be represented by the following formula.

$$\sigma^2(X)=S_2 \times a \times X + S_2^2 \times b \qquad \text{Formula 5}$$

Using these formulae, the noise characteristic in the regions in which a plurality of image signals are mixed (the processing regions 2 and 3 described in FIG. 5) is estimated. The noise characteristic obtained in a case where the short-term exposure image signals 1 and 2 are mixed can be represented by the following formula.

$$\sigma^2(\alpha \times X + \beta \times X) = \qquad \text{Formula 6}$$
$$\sigma^2(\alpha \times X) + \sigma^2(\beta \times X) = \alpha^2 \times \sigma^2(X) + \beta^2 \times \sigma^2(X)$$

When Formula 4 and 5 are substituted into Formula 6, and arranged, the following formula can be obtained.

[Math. 4]

$$\sigma(\alpha \times X + \beta \times X) = \sqrt{(\alpha^2 \times S_1 + \beta^2 \times S_2) \times a \times X + (\alpha^2 \times S_1^2 + \beta^2 \times S_2^2) \times b} \qquad \text{Formula 7}$$

As mentioned above, this formula 7 represents the noise characteristic obtained in a case where the short-term exposure image signals 1 and 2 are mixed. Here, by switching values of the mix ratios $\alpha$ and $\beta$, and the exposure ratios $S_1$ and $S_2$, it becomes possible to use Formula 7 for the estimation of the noise characteristic of the mixed image signal that is to be obtained after all types of processing in the processing regions 1 to 3 are performed.

A state of the switching of variables will be described with reference to FIGS. 7A and 7B.

FIGS. 7A and 7B are diagrams illustrating an example of switching of variables in the estimation of a mixed image signal noise in the first embodiment of the present technology. In this figure, "a" represents a state of switching of variables ($\alpha$, $\beta$, S1, and S2) for each processing region. In addition, in this figure, "b" represents a calculation method of $\beta 1$ and $\beta 2$ in "a" in this figure. By applying the switching of variables in this figure, to Formula 7, the noise characteristic obtained after the processing in the processing regions 1 to 3 can be represented by one formula (Formula 7).

[Estimate Processing of Mixed Image Signal Noise]

Figure 8:
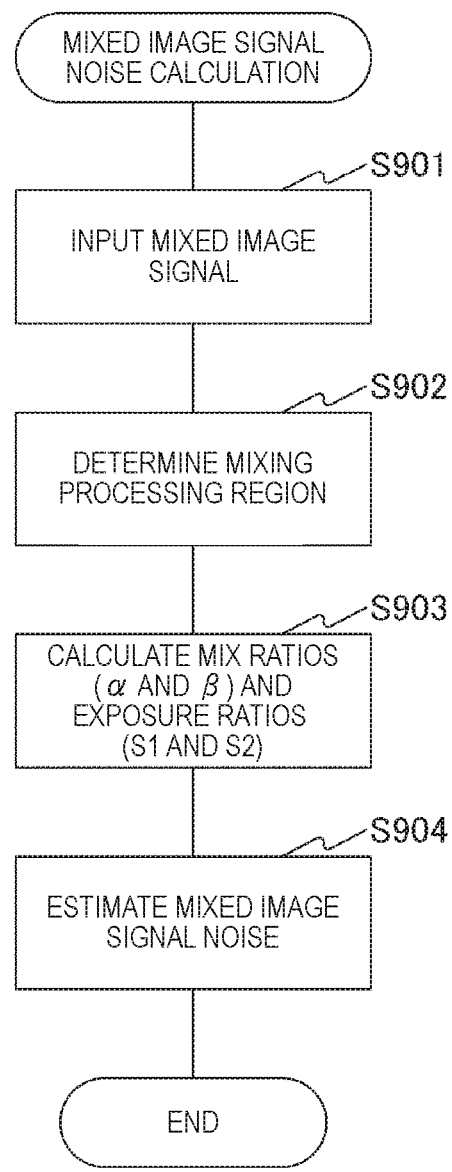
FIG. 8 is a diagram illustrating an example of a processing sequence of mixed image signal noise calculation processing in the embodiment of the present technology.

FIG. 8 is a diagram illustrating an example of a processing sequence of mixed image signal noise calculation processing in the embodiment of the present technology. First of all, a mixed image signal is input from the frame memory 410 to the input unit 401 (step S901). Next, the estimation unit 420 performs the determination of a mixing processing region (step S902). Specifically, the estimation unit 420 determines in which of the processing regions 1 to 3 the processing has been performed in the image signal mixing unit 300. Next, the estimation unit 420 calculates mix ratios ($\alpha$ and $\beta$) and exposure ratios (S1 and S2) (step S903). This can be performed on the basis of FIGS. 7A and 7B. Lastly, the estimation unit 420 performs the estimation of a mixed image signal noise (step S904). This can be performed by calculating the mixed image signal noise on the basis of Formula 7. Note that the calculation of the square root in Formula 7 can be performed using spline calculation.

As described above, the estimation unit 420 performs the estimation of the mixed image signal noise on the basis of the mix ratios ($\alpha$ and $\beta$), the noise characteristic coefficients (a and b), and the exposure ratios ($S_1$ and $S_2$). In addition, the estimation unit 420 estimates the mixed image signal noise on the basis of the noise characteristics of a plurality of image signals that have levels adjusted by multiplying the exposure ratios ($S_1$ and $S_2$), and the mix ratios ($\alpha$ and $\beta$). Thus, accurate estimation of the mixed image signal noise can be performed.

[Configuration of Two-Dimensional Noise Reduction Unit]

Figure 9:
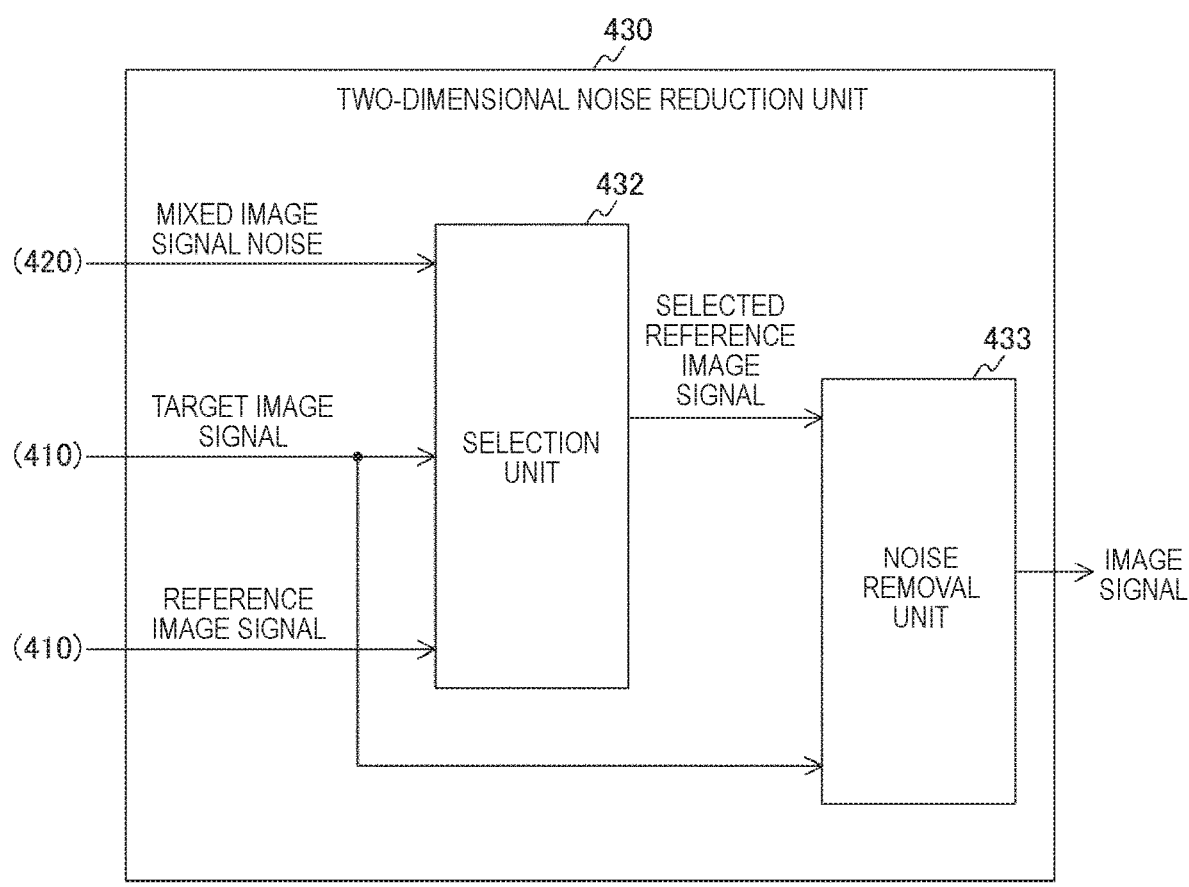
FIG. 9 is a diagram illustrating a configuration example of a two-dimensional noise reduction unit 430 in the first embodiment of the present technology.

FIG. 9 is a diagram illustrating a configuration example of the two-dimensional noise reduction unit 430 in the first embodiment of the present technology. The two-dimensional noise reduction unit 430 includes a selection unit 432 and a noise removal unit 433.

The selection unit 432 selects a reference image signal output from the frame memory 410, and outputs the reference image signal to the noise removal unit 433. The selection unit 432 performs the selection on the basis of a target image signal output from the frame memory 410, and a mixed image signal noise output from the estimation unit 420. The selection can be performed by selecting a reference image signal having a difference from the target image signal that is smaller than the mixed image signal noise, from among reference image signals. Here, among the reference image signals, reference image signals having differences from the target image signal that are larger than the mixed image signal noise are considered to correspond to texture. Thus, these reference image signals are excluded from the target of the generation of an average that is performed in the noise removal unit 433, which will be mentioned later.

The noise removal unit 433 generates an average of the reference image signal output from the selection unit 432, and a target image signal output from the frame memory 410. The noise removal unit 433 outputs the generated average as a new mixed image signal. High-frequency components in noises of the target image signal and the reference image signal selected by the selection unit 432 are thereby balanced out, and noises that had been included in the original target image signal can be deleted.

[Relationship Between Target Image Signal and Reference Image Signals]

Figure 10:
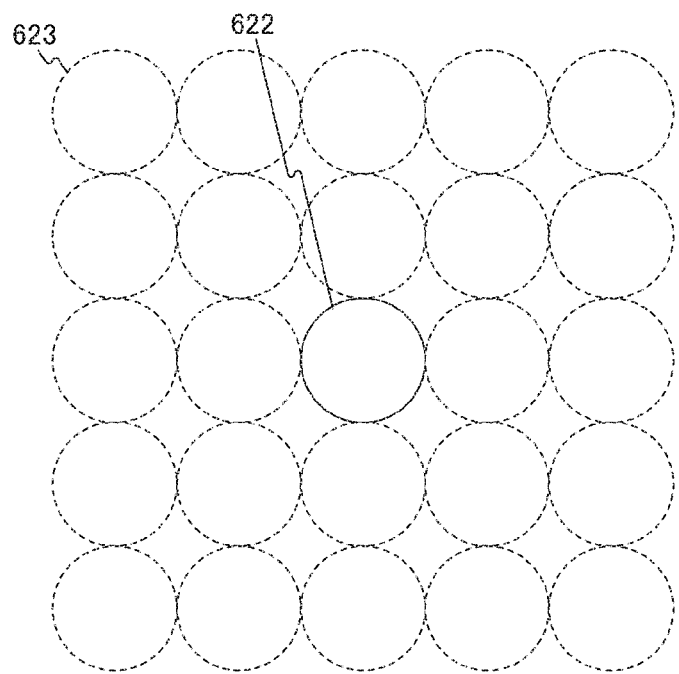
FIG. 10 is a diagram illustrating a target image signal and reference image signals in the first embodiment of the present technology.

FIG. 10 is a diagram illustrating a target image signal and reference image signals in the first embodiment of the present technology. This figure represents a relationship between a target image signal and reference image signals in a frame. Circular marks in this figure represent two-dimensionally arranged image signals. Among these circular marks, a solid circular mark represents a target image signal 622, and broken-line circular marks represent reference image signals 623. In this manner, the reference image signals 623 are image signals arranged around the target image signal 622. In addition, for example, the reference image signals can be limited to image signals arranged in a range of two pixels from the target image signal 622.

[Two-Dimensional Noise Reduction Processing]

Figure 11:
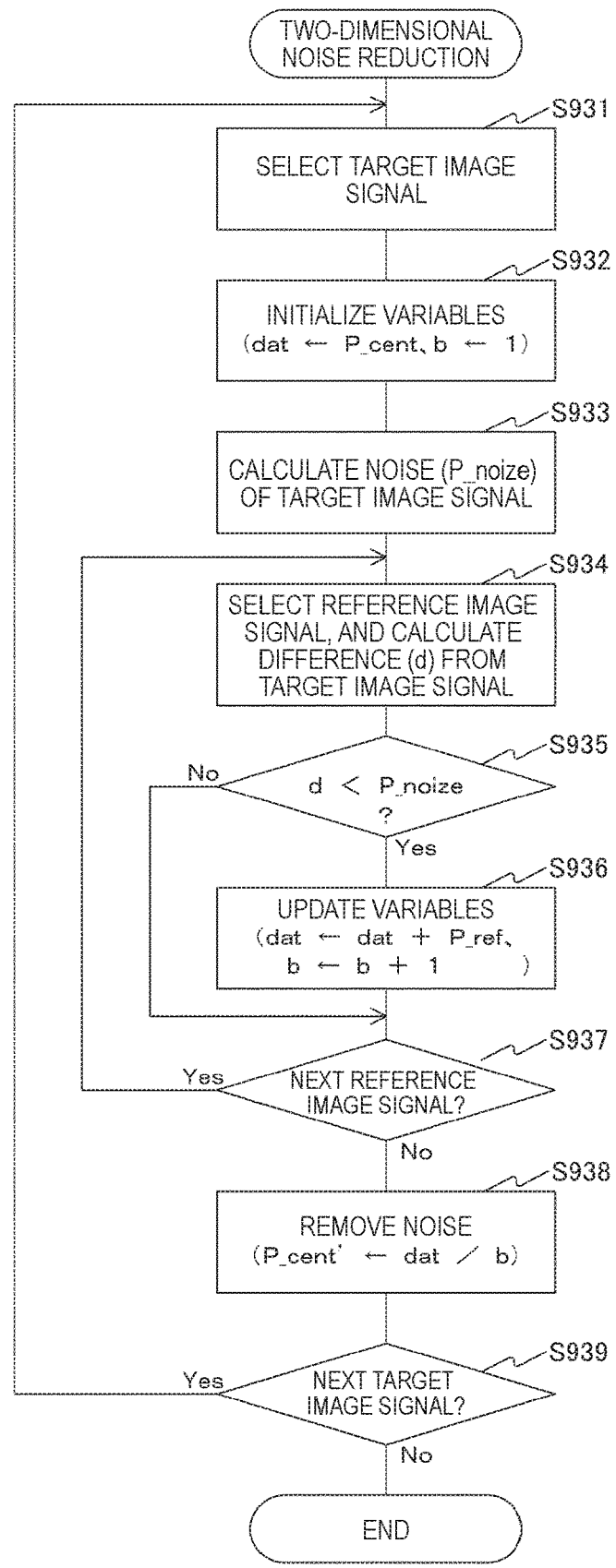
FIG. 11 is a diagram illustrating an example of a processing sequence of two-dimensional noise reduction processing in the first embodiment of the present technology.

FIG. 11 is a diagram illustrating an example of a processing sequence of two-dimensional noise reduction processing in the first embodiment of the present technology. First of all, the selection unit 432 selects a target image signal (step S931). The selected target image signal is output from the frame memory 410. Next, the two-dimensional noise reduction unit 430 performs initialization of variables (step S932). This can be performed by inputting P_cent being a value of the target image signal, into a variable dat, and inputting a value "1" into a variable b. Next, P_noize being a noise of the target image signal is calculated (step S933). This can be performed by the mixed image signal noise calculation processing described in FIG. 8. Next, the selection unit 432 selects a target image signal, and calculates a difference (d) from a reference image signal (step S934). As described in FIG. 10, the selection unit 432 selects one of the reference image signals 623 arranged around the target image signal 622, and causes the selected reference image signal to be output from the frame memory 410. Here, a value of the selected reference image signal is denoted by P_ref. In addition, the difference d can be calculated by calculation "IP_ref-P_cntI".

Next, the selection unit 432 determines whether the difference (d) is smaller than the mixed image signal noise (P_noize) (step S935). In a case where the difference is smaller than the mixed image signal noise (step S935: Yes), the noise removal unit 433 adds a value P_ref of the reference image signal to the variable dat, and adds a value "1" to the variable b, thereby updating the variables(step S936). And then, the processing shifts to processing in step S937. On the other hand, in a case where the difference is not smaller than the mixed image signal noise (step S935: No), the processing in step S936 is skipped, and the processing shifts to the processing in step S937. In step S937, the selection unit 432 determines whether the next reference image signal exists (step S937). In a case where the next reference image signal exists (step S937: Yes), processing from step S934 is executed again. In a case where processing has ended on all the image signals arranged around the target image signal (step S937: No), the noise removal unit 433 performs removal of the noise (step S938). This can be performed by generating an average by performing calculation of dat/b, and setting this average as a new mixed image signal (P_cent').

Next, the selection unit 432 determines whether the next target image signal exists (step S939). In a case where the next target image signal exists (step S939: Yes), processing from step S931 is executed again. In a case where noise removal processing has ended on all the mixed image signals in the frame (step S939: No), the two-dimensional noise reduction unit 430 ends the two-dimensional noise reduction processing.

In this manner, in the first embodiment of the present technology, the estimation of a mixed image signal noise is performed on the basis of mix ratios, noise characteristic coefficients, and exposure ratios. A noise of a signal obtained by mixing a plurality of image signals with different exposure times can be thereby accurately estimated.

<2. Second Embodiment>

In the aforementioned embodiment, the estimated mixed image signal noise is used for the two-dimensional noise reduction processing. In contrast to this, in a second embodiment of the present technology, an image processing apparatus that uses the estimated mixed image signal noise for three-dimensional noise reduction processing is assumed.

[Configuration of Image Processing Unit]

Figure 12:
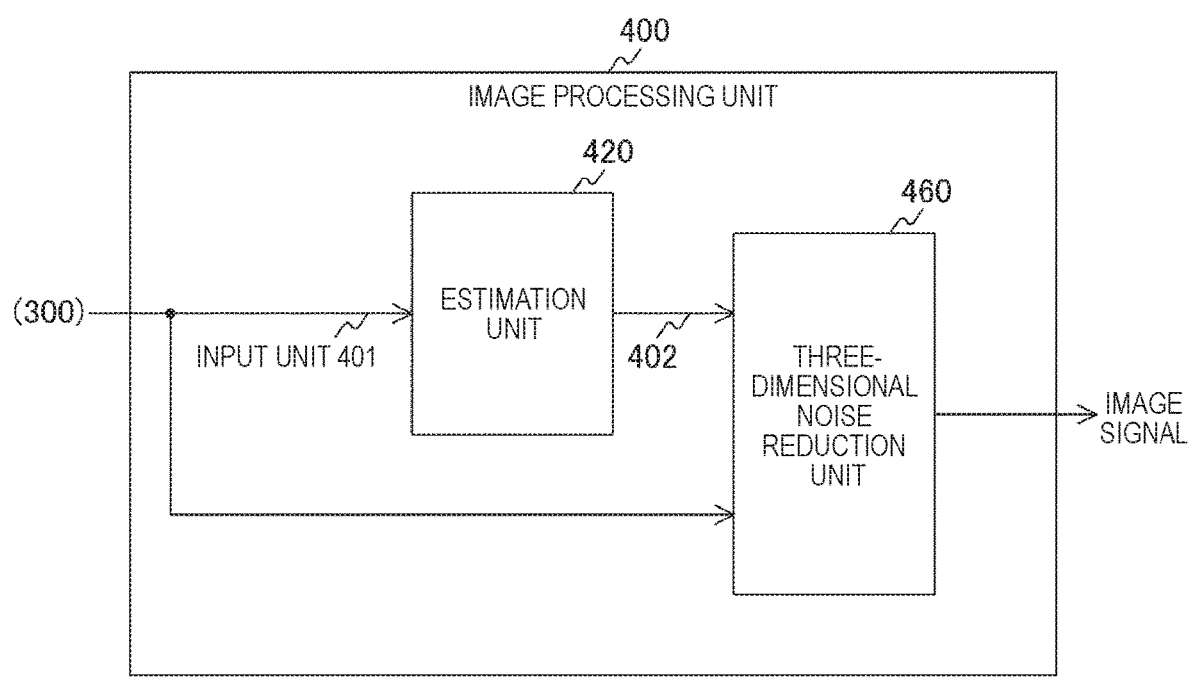
FIG. 12 is a diagram illustrating a configuration example of an image processing unit 400 in a second embodiment of the present technology.

FIG. 12 is a diagram illustrating a configuration example of an image processing unit 400 in the second embodiment of the present technology. The image processing unit 400 needs not include the frame memory 410, as compared with the image processing unit 400 described in FIG. 6. In addition, the image processing unit 400 differs from the image processing unit 400 described in FIG. 6, in that a three-dimensional noise reduction unit 460 is included in place of the two-dimensional noise reduction unit 430.

The three-dimensional noise reduction unit 460 removes a noise of a mixed image signal. The three-dimensional noise reduction unit 460 performs the removal of the noise using image signals belonging to a plurality of consecutive frames.

[Configuration of Three-Dimensional Noise Reduction Unit]

Figure 13:
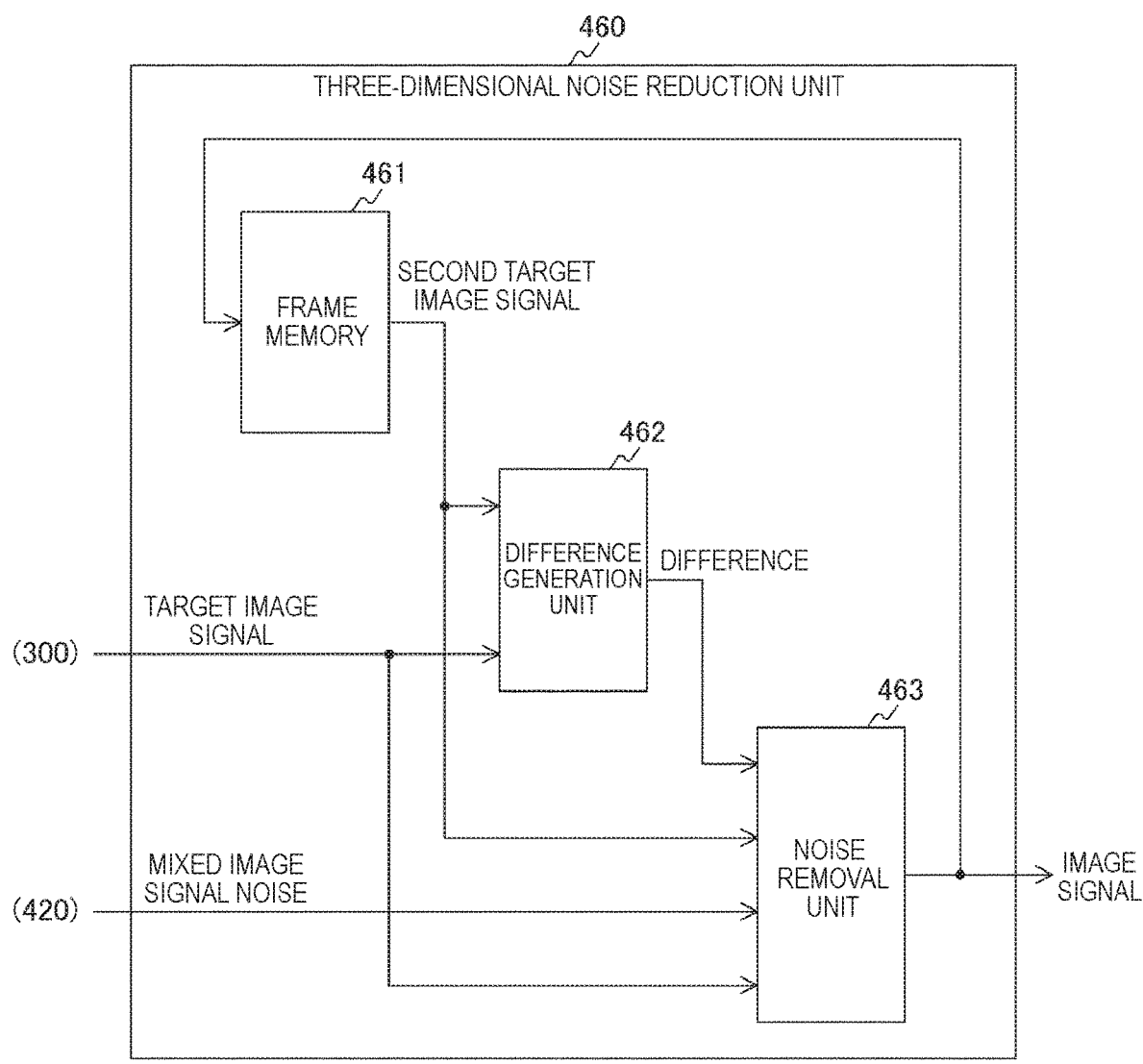
FIG. 13 is a diagram illustrating a configuration example of a three-dimensional noise reduction unit 460 in the second embodiment of the present technology.

FIG. 13 is a diagram illustrating a configuration example of the three-dimensional noise reduction unit 460 in the second embodiment of the present technology. The three-dimensional noise reduction unit 460 includes a frame memory 461, a difference generation unit 462, and a noise removal unit 463.

The frame memory 461 is a memory that stores a frame, similarly to the frame memory 410. The frame memory 461 differs from the frame memory 410 in that the frame memory 461 stores a mixed image signal output from the noise removal unit 463, which will be mentioned later.

The difference generation unit 462 generates a difference between a target image signal and a second target image signal. Here, a mixed image signal arranged at the same position as the target image signal in a frame different from that of the target image signal will be referred to as the second target image signal. The difference generation unit 462 generates a difference between the target image signal output from the image signal mixing unit 300, and the second target image signal output from the frame memory 461, and outputs the generated difference to the noise removal unit 463.

The noise removal unit 463 performs mixing of the target image signal and the second target image signal on the basis of a mixed image signal noise and the difference. By performing the mixing, a noise component of the target image signal is balanced out, and noise removal can be performed. The target image signal from which the noise has been removed is stored in the frame memory 461. Image signals of a plurality of consecutive frames are thereby accumulated, and leveling is performed. Thus, the three-dimensional noise reduction processing has a higher noise removal capability as compared with the aforementioned two-dimensional noise reduction processing. In addition, the mixing can be performed in a case where the difference generated by the difference generation unit 462 is smaller than the mixed image signal noise. In a case where the difference is larger than the mixed image signal noise, it can be determined that a difference is generated between the target image signal and the second target image signal due to a motion of an image. By excluding an image portion with a motion, from the target of the noise removal processing, a deterioration in an image that is caused by the noise removal processing can be prevented.

Note that the noise removal unit 463 can perform mixing on the basis of a mix ratio when performing the mixing of the target image signal and the second target image signal. Then, the mixing is performed while changing a mix ratio in the vicinity of the estimated mixed image signal noise. This enables switching of images to be smoothly performed in the vicinity of the mixed image signal noise. Note that the noise removal unit 463 is an example of a second noise removal unit described in the claims.

[Three-Dimensional Noise Reduction Processing]

Figure 14:
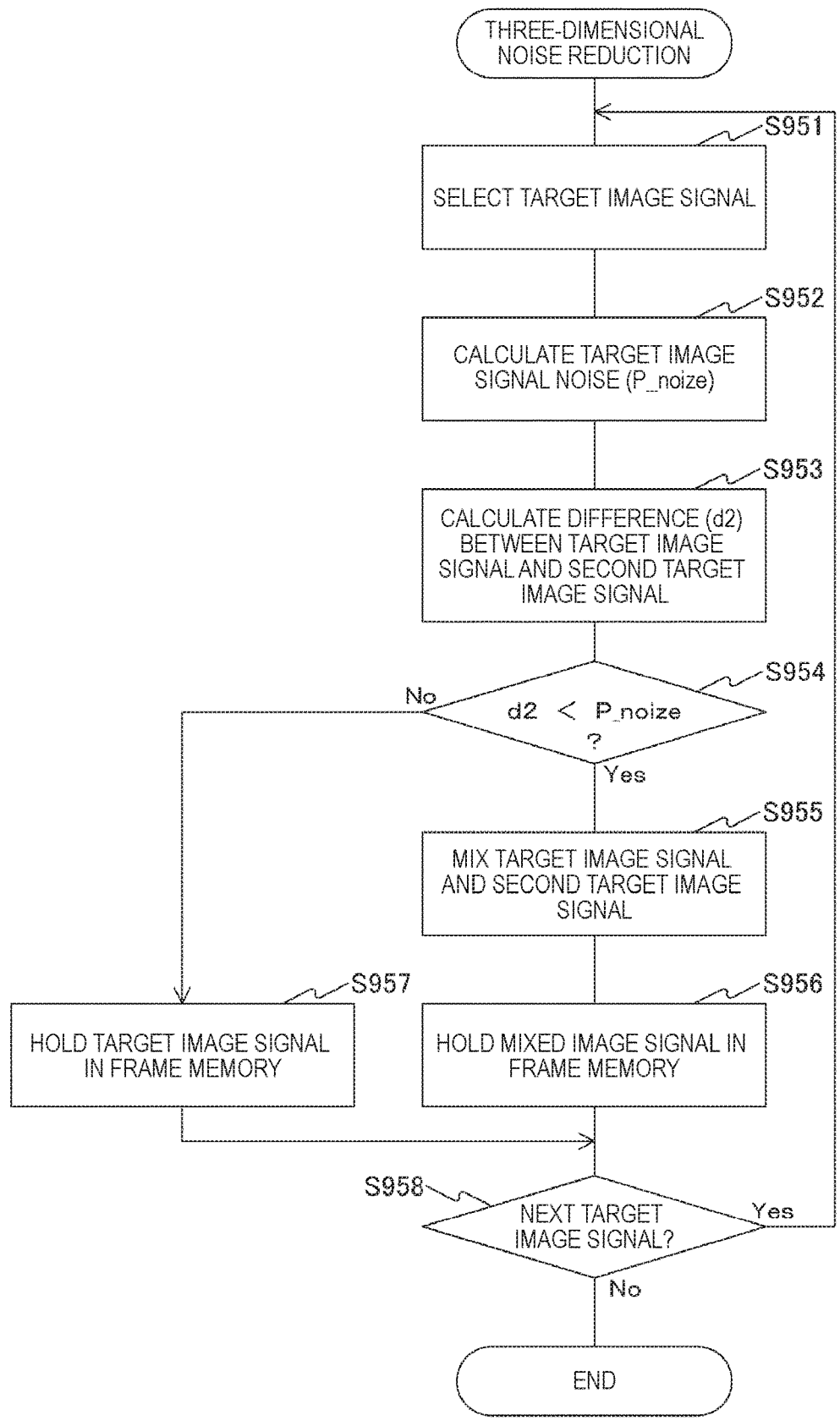
FIG. 14 is a diagram illustrating an example of a processing sequence of three-dimensional noise reduction processing in the second embodiment of the present technology.

FIG. 14 is a diagram illustrating an example of a processing sequence of three-dimensional noise reduction processing in the second embodiment of the present technology. First of all, the noise removal unit 463 selects a target image signal and a second target image signal (step S951). Next, a noise (P_noize) of the target image signal is calculated by the estimation unit 420 (step S952). This can be performed by the mixed image signal noise calculation processing described in FIG. 8. Next, the difference generation unit 462 calculates a difference (d2) between the target image signal and the second target image signal (step S953). Next, the noise removal unit 463 determines whether the difference (d2) is smaller than the mixed image signal noise (P_noize) (step S954). In a case where the difference is smaller than the mixed image signal noise (step S954: Yes), the noise removal unit 463 mixes the target image signal and the second target image signal (step S955). Next, the noise removal unit 463 holds a mixed image signal in the frame memory 461 (step S956), and the processing shifts to processing in step S958.

On the other hand, in a case where the difference is not smaller than the mixed image signal noise (step S954: No), the noise removal unit 463 holds the target image signal in the frame memory 461 (step S957). After that, the processing shifts to the processing in step S958. In step S958, the noise removal unit 463 determines whether the next target image signal exists (step S958). In a case where the next target image signal exists (step S958: Yes), processing from step S951 is executed again. In a case where noise removal processing has ended on all the mixed image signals in the frame (step S958: No), the three-dimensional noise reduction unit 460 ends the three-dimensional noise reduction processing.

The configurations of the imaging apparatus 10 other than this are similar to those of the imaging apparatus 10 described in the first embodiment of the present technology. Thus, the description will be omitted.

In this manner, in the second embodiment of the present technology, an image portion with a motion is accurately detected by comparing the difference between the target image signal and the second target image signal, with the estimated mixed image signal noise. A deterioration in an image in the three-dimensional noise reduction processing can be thereby prevented.

<Modified Example>

In the aforementioned embodiments, by performing exposure three times, the long-term exposure image signal, the short-term exposure image signal 1, and the short-term exposure image signal 2 are generated. In contrast to this, by setting different exposure times to pixels in the image sensor 200, the long-term exposure image signal, the short-term exposure image signal 1, and the short-term exposure image signal 2 may be generated. This can shorten a time required for the generation of an image signal.

[Configuration of Image Sensor]

Figure 15:
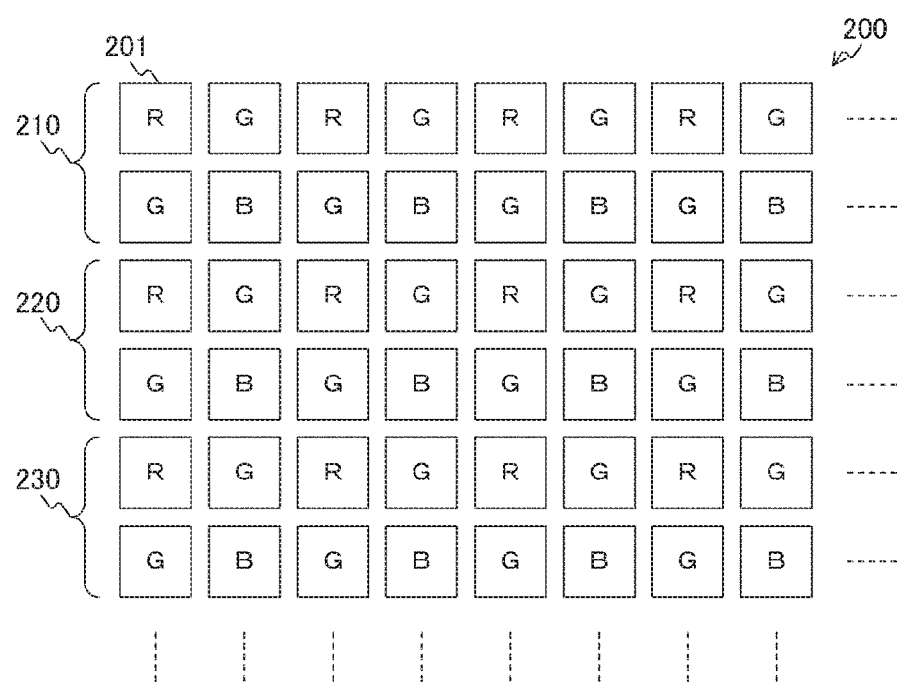
FIG. 15 is a diagram illustrating a configuration example of an image sensor 200 in a modified example of the embodiment of the present technology.

FIG. 15 is a diagram illustrating a configuration example of an image sensor 200 in a modified example of the embodiment of the present technology. This figure represents the arrangement of pixels 201 in the image sensor 200.

Characters added to the pixels 201 denote the types of the pixels 201 described in FIG. 1. Among these pixels, respective different exposure times are set to the pixels 201 arranged on the first and second rows (pixel row 210), the pixels 201 arranged on the third and fourth rows (pixel row 220), and the pixels 201 arranged on the fifth and sixth rows (pixel row 230). In addition, such setting of exposure times is repeatedly executed in order on all the rows in the image sensor 200. With this configuration, image signals with different exposure times can be generated by one exposure. For example, the generation of image signals can be performed by causing the pixel row 210, the pixel row 220, and the pixel row 230 to respectively correspond to the long-term exposure image signal, the short-term exposure image signal 1, and the short-term exposure image signal 2.

The configurations of the imaging apparatus 10 other than this are similar to those of the imaging apparatus 10 described in the first embodiment of the present technology. Thus, the description will be omitted.

In this manner, according to the modified example of the embodiment of the present technology, by setting different exposure times to respective pixel rows, a time required for the generation of an image signal can be shortened.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a CD (Compact Disc), an MD (MiniDisc), and a DVD (Digital Versatile Disc), a memory card, and a Blu-ray disc (registered trademark) can be used.

Note that the effects described in the present specification are not necessarily limited, and any effect described in the present disclosure may be exhibited.

Additionally, the present technology may also be configured as below.

(1)

An image processing apparatus including:

an input unit to which a mixed image signal is input, the mixed image signal being obtained by mixing a plurality of image signals with different exposure times that have been generated by an image sensor, on a basis of a predetermined mix ratio; and an estimation unit configured to estimate a mixed image signal noise being a noise of the mixed image signal, on a basis of the mix ratio, a noise characteristic coefficient indicating a noise characteristic of the image sensor, and a ratio between the exposure times in the plurality of image signals.

(2)

The image processing apparatus according to (1), in which the estimation unit estimates the mixed image signal noise on a basis of a plurality of noise characteristics with levels adjusted by multiplying respective noise characteristics in the plurality of image signals that are indicated by the noise characteristic coefficient, by a ratio between the exposure times, and the mix ratio.

(3)

The image processing apparatus according to (1) or (2), further including:

a selection unit configured to select, among a plurality of mixed image signals included in a same frame as a target image signal being the mixed image signal for which the mixed image signal noise has been estimated, a mixed image signal having a difference from the target image signal that is smaller than the estimated mixed image signal noise; and a noise removal unit configured to remove a noise of the target image signal by generating an average of the target image signal and the selected mixed image signal.

(4)

The image processing apparatus according to (1) or (2), further including:

a difference generation unit configured to generate a difference from a second target image signal being a mixed image signal arranged, in a frame different from a target image signal being the mixed image signal for which the mixed image signal noise has been estimated, at a same position as the target image signal; and a second noise removal unit configured to remove a noise of the target image signal by performing mixing of the target image signal and the second target image signal on a basis of the generated mixed image signal noise and the generated difference.

(5)

The image processing apparatus according to (4), in which the second noise removal unit performs the mixing in a case where the generated difference is smaller than the generated mixed image signal noise.

(6)

An image processing method including:

an input sequence in which a mixed image signal is input, the mixed image signal being obtained by mixing a plurality of image signals with different exposure times that have been generated by an image sensor, on a basis of a predetermined mix ratio; and an estimation sequence of estimating a mixed image signal noise being a noise of the mixed image signal, on a basis of the mix ratio, a noise characteristic coefficient indicating a noise characteristic of the image sensor, and a ratio between the exposure times in the plurality of image signals.

REFERENCE SIGNS LIST 10 imaging apparatus
100 lens
200 image sensor
201 pixel
210, 220, 230 pixel row
300 image signal mixing unit
400 image processing unit
401 input unit
410, 461 frame memory
420 estimation unit
430 two-dimensional noise reduction unit
432 selection unit
433, 463 noise removal unit
460 three-dimensional noise reduction unit
462 difference generation unit
500 control unit
622 target image signal
623 reference image signal

The invention claimed is:

1. An image processing apparatus, comprising:
a processor configured to:
receive a first mixed image signal, wherein the first mixed image signal comprises a mixture of a plurality of image signals with different exposure times mixed based on a determined mix ratio, wherein the plurality of image signals is generated by an image sensor;
estimate a mixed image signal noise based on the determined mix ratio, a noise characteristic coefficient indicating a noise characteristic of the image sensor, and a ratio between the different exposure times in the plurality of image signals;
select, among a plurality of mixed image signals in a same frame as a target image signal for which the mixed image signal noise has been estimated, a second mixed image signal having a difference from the target image signal that is smaller than the estimated mixed image signal noise, wherein the target image signal is the first mixed image signal; and
generate an average of the target image signal and the selected second mixed image signal to remove a noise of the target image signal.

2. The image processing apparatus according to claim 1, wherein the processor is further configured to estimate the mixed image signal noise based on a plurality of noise characteristics, wherein levels of the plurality of noise characteristics are adjusted by multiplication of respective noise characteristics of the plurality of image signals that are indicated by the noise characteristic coefficient, by the ratio between the different exposure times.

3. An image processing method, comprising:
receiving a first mixed image signal, wherein the first mixed image signal comprises a mixture of a plurality of image signals with different exposure times mixed based on a determined mix ratio, wherein the plurality of image signals is generated by an image sensor;
estimating a mixed image signal noise based on the determined mix ratio, a noise characteristic coefficient indicating a noise characteristic of the image sensor, and a ratio between the different exposure times in the plurality of image signals;
selecting, among a plurality of mixed image signals in a same frame as a target image signal for which the mixed image signal noise has been estimated, a second mixed image signal having a difference from the target image signal that is smaller than the estimated mixed image signal noise, wherein the target image signal is the first mixed image signal; and
generating an average of the target image signal and the selected second mixed image signal to remove a noise of the target image signal.

4. An image processing apparatus, comprising:
a processor configured to:
receive a first mixed image signal, wherein the first mixed image signal comprises a mixture of a plurality of image signals with different exposure times mixed based on a determined mix ratio, wherein the plurality of image signals is generated by an image sensor;
estimate a mixed image signal noise based on the determined mix ratio, a noise characteristic coefficient indicating a noise characteristic of the image sensor, and a ratio between the different exposure times in the plurality of image signals;
generate a difference between a second target image signal and a first target image signal, wherein the second target image signal is a second mixed image signal arranged at a same position as the first target image signal in a frame different from the first target image signal, wherein the first target image signal is the first mixed image signal for which the mixed image signal noise has been estimated; and
mix the first target image signal and the second target image signal based on the mixed image signal noise and the generated difference to remove a noise of the first target image signal.

5. The image processing apparatus according to claim 4, wherein the processor is further configured to mix the first target image signal and the second target image signal in a case where the generated difference is smaller than the mixed image signal noise.

* * * * *